L. A. LARSON.
AUTOMOBILE SIGNAL.
APPLICATION FILED SEPT. 15, 1919.
1,368,812.
Patented Feb. 15, 1921.
2 SHEETS—SHEET 1.
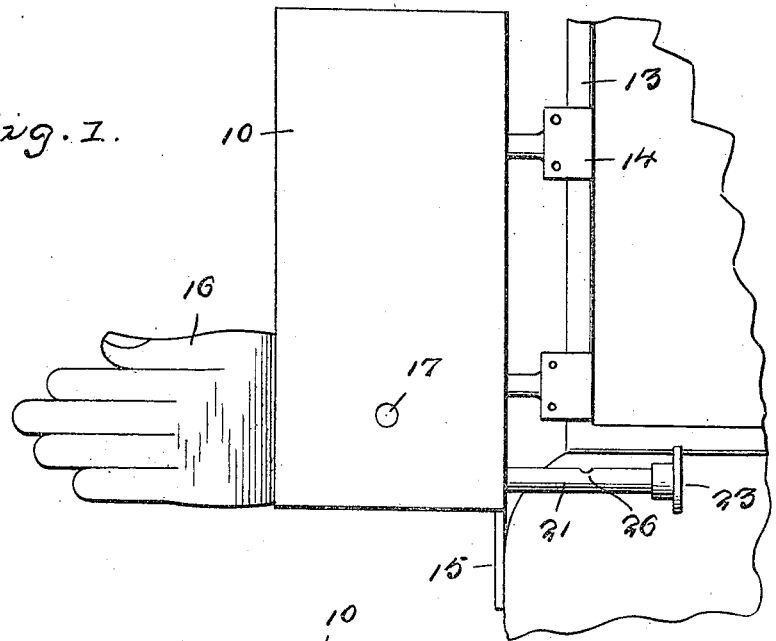
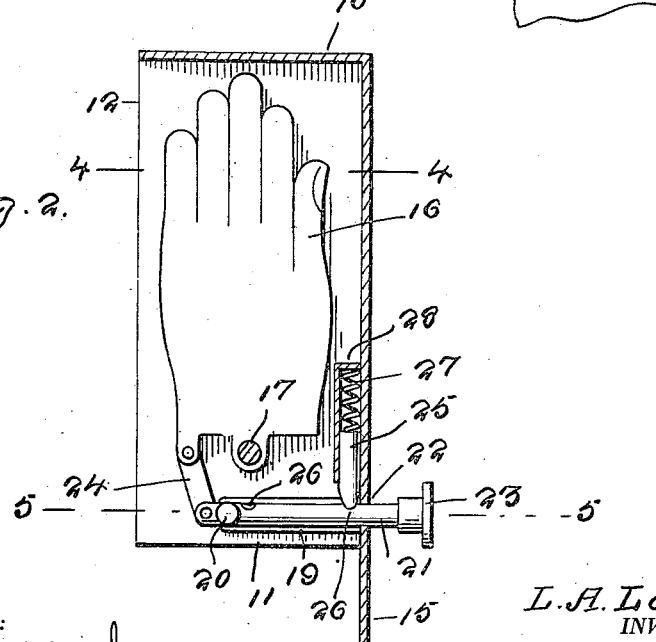
WITNESS:
E. R. Ruppert.
L. A. Larson
INVENTOR.
BY
Victor J. Evans
ATTORNEY.

L. A. LARSON.
AUTOMOBILE SIGNAL.
APPLICATION FILED SEPT. 15, 1919.
1,368,812.
Patented Feb. 15, 1921.
2 SHEETS—SHEET 2.
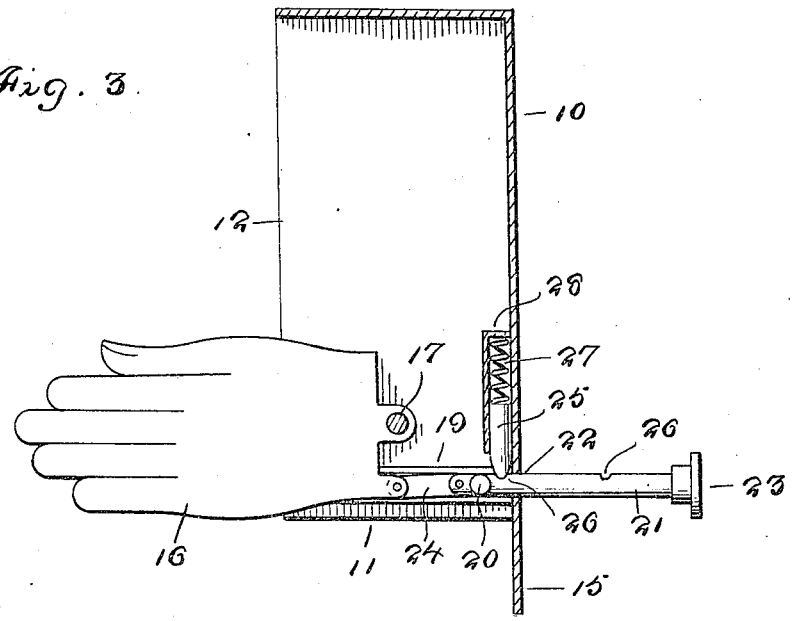
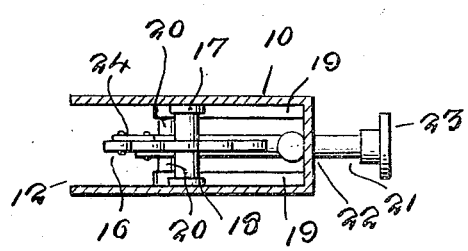
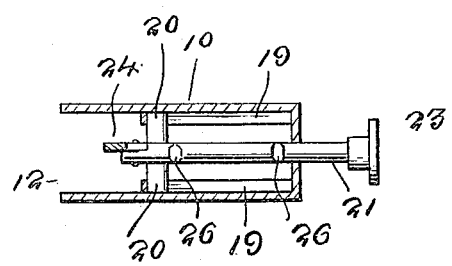
WITNESS:
E. R. Ruppert
L. A. Larson
INVENTOR.
BY
Victor J. Evans
ATTORNEY.

UNITED STATES PATENT OFFICE.

LAWRENCE A. LARSON, OF WEST DULUTH, MINNESOTA.

AUTOMOBILE-SIGNAL.

1,368,812.  Specification of Letters Patent.  Patented Feb. 15, 1921.

Application filed September 15, 1919. Serial No. 323,692.

*To all whom it may concern:*

Be it known that I, LAWRENCE A. LARSON, a citizen of the United States, residing at West Duluth, in the county of St. Louis and State of Minnesota, have invented new and useful Improvements in Automobile-Signals, of which the following is a specification.

This invention relates to vehicle signals and aims to provide a direction signal, which is especially designed for use upon closed or covered vehicles.

Another object of the invention is the provision of a signal of this character, which is neat in appearance, simple of construction, and which may be conveniently operated by the driver of the vehicle.

For the accomplishment of the above and other objects, the invention includes the following novel features and details of construction, to be hereinafter more fully described and illustrated in the accompanying drawings.

In the drawings:

Figure 1 is a front elevation of a portion of the wind shield of a motor vehicle, with the invention applied thereto.

Fig. 2 is a vertical section with the signal arm in an inactive position.

Fig. 3 is a view similar to Fig. 2 with the arm extended.

Fig. 4 is a horizontal section on the line 4—4 of Fig. 2.

Fig. 5 is a section on the line 5—5 of Fig. 2.

Referring to the drawings in detail, wherein like characters of reference denote corresponding parts, the signal comprises a substantially rectangular casing 10, which is open at the bottom, as indicated at 11 and also at one side, as shown at 12. This casing is adapted to be secured to the wind shield frame 13 of the vehicle and for this purpose there is provided clamps 14, which engage and are fastened to the said frame. To provide further means for securing the signal in position, there is provided a bracket 15, having openings therein by means of which the signal may be secured to the side of the vehicle.

Pivotally mounted within the casing 10, is a signal arm 16, the latter preferably being in the form of a hand and carrying at one end a pivoted shaft 17, which is mounted in bearings 18, provided in the casing.

Located within the casing and connecting the bottom edges thereof, is a guide, which includes spaced slots or grooves 19, which are adapted to receive oppositely extending arms or pins 20, carried by a sliding operating lever 21. One end of this lever extends through an opening 22 in the casing 10 and is provided with a handle 23, located within convenient reach of the driver of the vehicle. The opposite end of the slidably mounted lever 21 is connected to the signal arms 16 by means of a rod 24, so that a pull upon the lever 21 will move the signal arm upon its pivot and project the said arm through the open side 12 of the casing.

To prevent accidental movement of the signal arm 16, there is provided a slidably mounted dog 25, one end of which is rounded for engagement with a socket 26, formed in the lever 21. A coiled spring 27, which is located within a housing 28, carried by the casing, bears upon the opposite end of the dog 25 to yieldingly hold the said dog within the socket 26. The tension of this spring is such that a slight pull upon the lever 21 will release the dog from the socket 26, so as to permit of the operation of the signal arm.

The foregoing described invention is especially adapted for use upon closed or covered vehicles, so as to permit of the display of a direction signal without opening the door or window, the signal being secured in such position so that the lever 21 may project through a suitable opening in the body of the vehicle.

The invention is susceptible of various changes in its form, proportions and minor details of construction and the right is herein reserved to make such changes as properly fall within the scope of the appended claim.

Having described the invention, what is claimed is:

A vehicle signal comprising a casing adapted to be secured upon the side of a vehicle, a pivoted signal arm normally disposed within the casing, a slidably mounted operating lever having one end projecting without the casing, an arm projecting from each side of the operating lever, guide slots located in said casing to receive the projecting arms and the guide of said lever in its sliding movement, a rod connecting the opposite end of the operating lever with the signal arm and means carried by the casing and engageable with the operating lever for holding the latter against accidental movement.

In testimony whereof I affix my signature.

LAWRENCE A. LARSON.